US 6,721,416 B1

(12) United States Patent
Farrell

(10) Patent No.: US 6,721,416 B1
(45) Date of Patent: Apr. 13, 2004

(54) CALL CENTRE AGENT AUTOMATED ASSISTANCE

(75) Inventor: Anthony Timothy Farrell, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 09/592,401

(22) Filed: Jun. 13, 2000

(30) Foreign Application Priority Data

Dec. 29, 1999 (GB) .............................................. 9930720

(51) Int. Cl.[7] .................................................. H04M 3/00
(52) U.S. Cl. ............................ 379/265.07; 379/265.02; 379/266.07; 379/88; 379/13
(58) Field of Search ........................ 379/265.01, 265.02, 379/265.06, 265.07, 266.07, 88.13, 88.14, 88.01–88.03; 704/270

(56) References Cited

U.S. PATENT DOCUMENTS 6,510,414 B1 * 1/2003 Chaves ........................ 704/270

* cited by examiner

Primary Examiner—Fan Tsang
Assistant Examiner—Ovidio Escalante
(74) Attorney, Agent, or Firm—A. Bruce Clay

(57) ABSTRACT

This invention relates to the automated assistance of a telephony call center agent comprising a method and system for providing dialogue suggestions to an agent during an agent caller interaction. A prior art solution provides data based on analyzed text from one or other of the conversations but does not offer any useful information based on the performance of the agent or on the state of the interaction. A method of interaction in a voice response application comprising: receiving a voice signal in a call center; identifying whether the caller or a call center agent is the originator of the voice signal; converting the voice signal into computer readable text; identifying a key word such as a confrontational phrase e.g. 'what are you talking about' in the converted computer readable text; and providing a different suggestion depending on whether the originator is the call agent or the caller. For instance, a suggestion if the agent made the confrontational phrase would be to use a less confrontational phrase next time such as 'can you explain that again'. A suggestion if the caller made the confrontational phrase would be to counter with a 'I'll try to explain that better'.

18 Claims, 4 Drawing Sheets

FIG. 2

| KEY PHRASE | POLITE ALTERNATIVE | COUNTER PHRASE | VALUE |
|---|---|---|---|
| You've canceled | you decided to cancel | I'm sorry your flight was canceled | 1 |
| what do you want? | how can I help you? | Sorry to bother you but ... | 2 |
| hurry up | please speak a little slower | I'll try and speed up | 3 |
| what are you talking about | can you explain that a little more? | I'll try to explain that better | 2 |
| Don't waste my time | Are you sure that is necessary | I am trying to help | 3 |
| I've already said that | I may have mentioned that previously | I beg your pardon | 3 |
| you're not listening | do you understand? | I'd appreciate a little more patience with the situation we're very busy | 3 |
| it's your fault | it's not entirely our fault | I'm sorry you feel that way | 3 |
| I don't care | is that relevant? | it is quite important | 1 |
| there's nothing I can do | I'm sorry there appears to be no other options | have you tried every possible option | 2 |
| that's not acceptable | maybe that isn't so reasonable | I'm sorry you feel that way | 2 |
| I demand that you do something about it | | we will try our best to improve the situation | 2 |
| thousands of pounds | | check priority option | 2 |

FIG. 3

| ref. | party | score | Dialogue | Suggestion |
|---|---|---|---|---|
| 1 | A | 0 | How may I help you? | |
| 2 | C | -1 | You've canceled my flight and I need to get to New York for a meeting tomorrow morning | I'm sorry your flight has been cancelled but... |
| 3 | A | -2 | There's nothing I can do till tomorrow afternoon | I'm sorry but there appears to be no other options |
| 4 | C | -5 | it's your fault that the flight is canceled - I demand that you do something about it | I'm sorry you feel that way .... we will try our besst to improve the situation |
| 5 | A | -5 | We can give you an upgrade to 1st on the next flight | Would you consider .... |
| 6 | C | -6 | I don't think you understand - I'm an executive club passenger | |
| 7 | A | -9 | You're not listening - there are no more flights | I'd appreciate a little patience with the situation we're very busy |
| 8 | C | -11 | My company spends thousands of pounts a year on flights with your airline - if you don't get me to New York on time we will change our preferred airline | Priority - try all options |
| 9 | A | -11 | We might be able to get you a seat on concord. | |

CALL CENTRE AGENT AUTOMATED ASSISTANCE

FIELD OF INVENTION

This invention relates to the automated assistance of a telephony call centre agent. In particular it relates to a method and system for providing dialogue suggestions to an agent during an agent caller interaction.

BACKGROUND OF INVENTION

A call centre can be defined as a place in a company or business that handles incoming and/or outgoing calls from/to its customers in support of its day-to-day operation. This can be a telemarketing area, where the employees make outgoing calls to try and sell the company's products. It can be a service area that receives incoming calls from its customers for repair or maintenance of the company's goods or services. A call centre will have a telephone system which may be as simple as a small single-line phone, increasing in complexity up to a large multi-node PBX. A call centre would normally have a computerized system for tracking, logging and recording call details, although some simply use paper forms. It may have one operator or agent, or it may have many, depending on the size of the company or business.

A call centre company needs to ensure quality control on their agents performance in an interaction with a caller in order to maintain customer satisfaction and to keep an acceptable call rate through each agent. One way to educate agents is to record their interaction with a caller and have a supervisor go through the recording and discuss possible problems and area of improvement. However this education is performed off line and is expensive in human resource terms. Much cheaper is an automatic prompt system offering hints and suggestions to the caller.

British patent application GB2333 173 discloses an intelligent human computer interface providing real time context data in relation to automatically recognized input signals. The system monitors in real time the operator and caller speech input to extract a subject matter. Once the subject has been identified an action is determined to provide useful data to the agent such as a database link. This may involve querying one or more databases with the extracted subject and providing visual data based on the result. This prior art solution provides data based on analyzed text from one or other of the conversations and does not offer any useful information based on the performance of the agent or on the state of the interaction.

SUMMARY OF INVENTION

In one aspect of the present invention there is provided an interactive voice response application as claimed in claim 1 and a method of interactive voice recognition as in claim 10. Therefore the invention provides a method of making suggestions and comments on the interaction between the agent and the caller that has only been previously possible with a human supervisor. The invention provides a suggestion to the agent that can be used to counter a particular (e.g. confrontational) key word spoken by a caller. The agent can be provided with one or more possible alternatives so that they can chose the most appropriate. Furthermore the invention provides a comment to the agent to his own dialogue so that if the agent is being is using inappropriate language (e.g. confrontational) a polite alternative or alternatives can be suggested for next time.

Advantageously the means for providing a key word suggestion comprises: means for providing an alternative key word if the originator is the call centre agent; and means for providing a counter key word or phrase if the originator is the caller. Preferably each key word is stored in a field of a record in a key word table, a further field stores an alternative word and a further field stores the counter word so that once the keyword is known the alternative or counter words may be acquired by lookup. These provides a simple and quick method of providing supervision to an interaction.

In the preferred embodiment the IVR application further comprises means for placing comments and suggestions on the caller workstation as the call is being placed so that the agent can have suggestions in real time as the call is going through and helpful suggestions can be chosen from to aid the interaction.

In the preferred embodiment the IVR application further comprises means for storing the dialogue text and the comment and suggestion text together for later retrieval so that an agent can review past performance, see the text version of the dialogue and compare the suggestions and comments.

In the preferred embodiment the IVR application further comprises means for grading each computer readable text with respect to the key word text so that a total grade for the interaction may be found. A further field in the key word table stores most advantageously stores a value for the key word being an subjective grading of the strength of inappropriateness or in the present embodiment a subjective grading of the strength of confrontation of the keyword. In this embodiment each key word in a dialogue line takes away the value of that keyword from the total grade. The IVR application further comprises means for storing the individual grade and the overall grade together with the dialogue text.

A key word means a single word or groups of words that form a phrase.

In this description the word 'caller' represents not only a party making an incoming telephone call but also a party that is the recipient of a telephone call.

BRIEF DESCRIPTION OF DRAWINGS

In order to promote a fuller understanding of this and other aspects of the present invention, an embodiment will now be described, by way of example only, with reference to the accompanying drawings in which:

FIG. 2 is an example of a word table of the embodiment;

FIG. 3 is an example of a dialogue store of the embodiment; and

DETAILED DESCRIPTION OF PREFERRED EMBODIMENT

Figure 1:
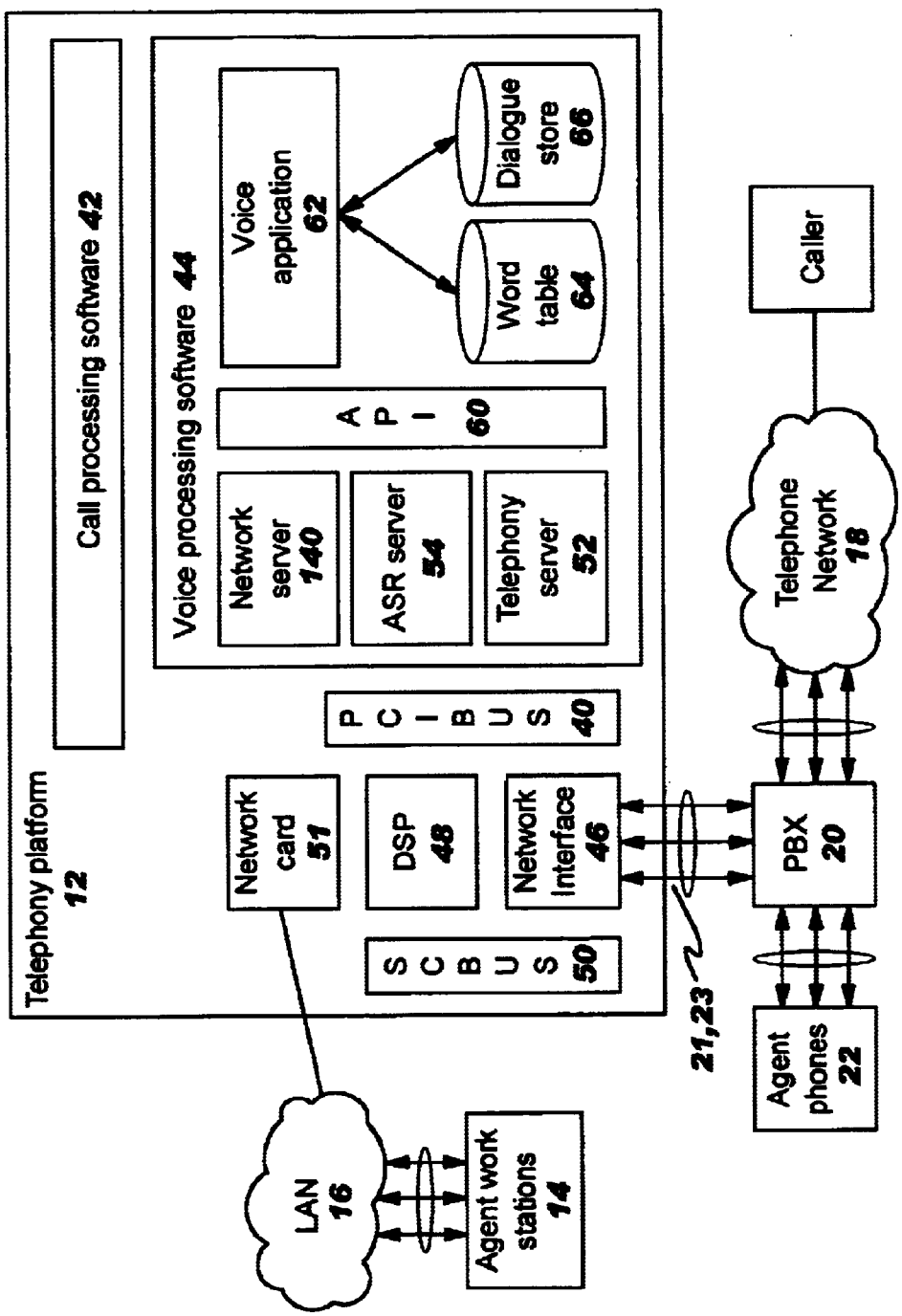
FIG. 1 is a schematic representation of a call centre of the embodiment.

Referring to FIG. 1 a call centre 10 comprises: a PC based computer telephony platform 12; a number of PC based computer clients or agent workstations 14 connected to the telephony platform 12; a local area network (LAN) 16 connecting the workstations 14 and the telephony platform 12; a telephony switch (PBX) 20; a control line 21 connecting the telephony platform 12 with the switch 20; telephone lines 23 connecting the telephony platform 12 with switch 20; agent telephones 22 corresponding to each of the workstations 14 connected to the switch 20. Additional telephone lines connect switch 20 to public telephony network 18 and switch 20 to agent phones 22.

The switch 20 makes, breaks or changes the connections between telephone lines in order to establish, terminate, or change a telephone call path; it is typically a private branch switch residing on the same premises as the telephony platform 12. The switch 20 would suitably be a Siemens Hicom* 300 but could be one of many suitable switches provided amongst others by Lucent, Nortel or Alcatel. The switch 20 provides network information to the telephony application such as ANI (answer number identification, also known as Caller Line Identification (CLI)) and DNI (dialled number identification). It also allows telephony platform 12 to perform intelligent dialing functions and to transfer calls.

Each workstation 14 is typically a Pentium microprocessor based PC with 32M bytes of memory, 4 Gbytes of hard drive, keyboard, mouse and VDU connected to the LAN 16 using an Ethernet card. A suitable operating system is Microsoft NT for workstations running the workstation application. The workstation application sends and receives messages from the switch through the LAN 16 and telephony application using an application programming interface which is part of the telephony application.

Telephony platform 12 comprises: a personal computer with an Industry Standard Architecture (ISA) bus or a Peripheral Component Interconnect (PCI) bus 40, running Microsoft Windows NT; call processing software 42; voice processing software 44; one or more Dialogic or Aculab network interface cards 46 for connecting the required type and number of external telephone lines 23; one or more Dialogic voice processing cards 48; a System Computing Bus (SCbus) 50; and LAN network interface 51. SCbus 50 is a dedicated voice data bus which connects the network card 46 and the DSP card 48 so that data flow congestion on the PCI system bus is avoided and voice processing speed is increased. Telephony platform 12 supports up to 60 E1 or 48 T1 telephone lines 23 connected through telephony network interface 46. If call volumes require more than 60 E1 or 48 T1 lines, additional voice processing systems can be connected together through the LAN 16.

Call processing software is suitably based on IBM CallPath software for controlling the interactions between the agent workstations and agent telephones.

The voice processing software 44 comprises IBM's Voice Response for Windows (previously known as IBM DirectTalk/2) is a powerful, flexible, yet cost-effective voice-processing software for the Windows NT operating system environment. Although the embodiment is described for Windows, an equivalent platform is also available for the UNIX environment from the IBM Corporation, in which case a maximum of 12 digital trunks per system (360 E1 or 288 T1 channels) may be supported. Used in conjunction with voice processing hardware, Voice Response can connect to a Public Telephone Network directly or via a PBX. It is designed to meet the need for a fully automated, versatile, computer telephony system. Voice Response for Windows NT not only helps develop voice applications, but also provides a wealth of facilities to help run and manage them. Voice Response can be expanded into a networked system with centralized system management, and it also provides an open architecture, allowing customization and expansion of the system at both the application and the system level.

The voice processing software 44 comprises: a telephony server 52; an automatic speech recognition (ASR) server 54; a natural language understanding (NLU) server (not shown); a dialogue manager (DM) server (not shown); a development work area (not shown); an application manager (not shown); a node manager (not shown); a general application programming interface (API) 60; voice application 62; word table 64; and dialogue store 66. API 60 is a conduit for all communications between the component parts of the voice processing software 44. A server is a program that provides services to the voice response application 62 or any other client. The modular structure of the voice processing software 44 and the open architecture of the general server interface API 60 allows development of servers that are unique to specific applications. A user-defined server can provide a bridge between the voice processing software and another product.

Telephony server 52 connects to the network interface 46 and provides telephony functionality to the voice response application.

The automatic speech recognition (ASR) server 54 is large-vocabulary, speaker-independent continuous function based on IBM ViaVoice and using DSP 48 to perform the preliminary frequency analysis on the voice signal. The voice signal is converted into frequency coefficients by the DSP 48 which are passed on to the ASR server 54 to perform Markov analysis and phoneme matching to acquire machine-readable text.

The development work area allows the creation and modification of a voice-processing application. The application manager executes the voice response application. The node manager allows monitoring of the status of application sessions and telephone lines and allows the issue of commands to start and stop application sessions.

Voice application 62 controls the interaction between the voice processing software 44 and a caller. Applications are written in Telephony Java, which incorporates the power and ease-of-use of the Java programming language. The voice processing system can run up to sixty applications simultaneously ranging from one voice response application running on all sixty lines to sixty different voice applications 62 each running on a separate line.

The word table 64 comprises a plurality of records having four fields, this is shown in more detail in FIG. 2. Each record represents a confrontational statement, phrase or word. The first field contains the text of the confrontational statement or phrase. The second field contains the text of a non-confrontational alternative for the confrontational statement or phrase. The third field contains the text of a non-confrontational counter phrase to the original confrontational phrase. The fourth field contains an absolute numerical value representing the strength of the confrontational phrase. For instance, confrontational phrase 'what are you talking about?' has a confrontation value 2. The confrontation value is subtracted from confrontational score for the interaction. A non-confrontational alternative is 'I'm not sure I understand you?' which the system might suggest if it detects that the agent has made the confrontational statement. If the agent uses the non-confrontational statement then the confrontational value is added to the confrontational score for the interaction. A counter statement to the confrontational statement might be "I'll try to explain that better", which the system suggests if it detects that the caller has made a confrontational statement. If the agent uses the counter statement then the confrontational value is added to the confrontational score for the interaction to give an improved score.

The dialogue store 66 comprises a plurality of records for storing the interaction and the interaction score and is illustrated with an example in FIG. 3. Each record contains three fields. The first field contains the number of the dialogue line so that the dialogue may be viewed in the order in which it happened. The second field contains an indicator of whether it is the caller or the agent's dialogue. The third field contains the text of the dialogue. The fourth field contains a voice application suggestion or comment. The fifth field contains a cumulative interaction score.

Figure 4:
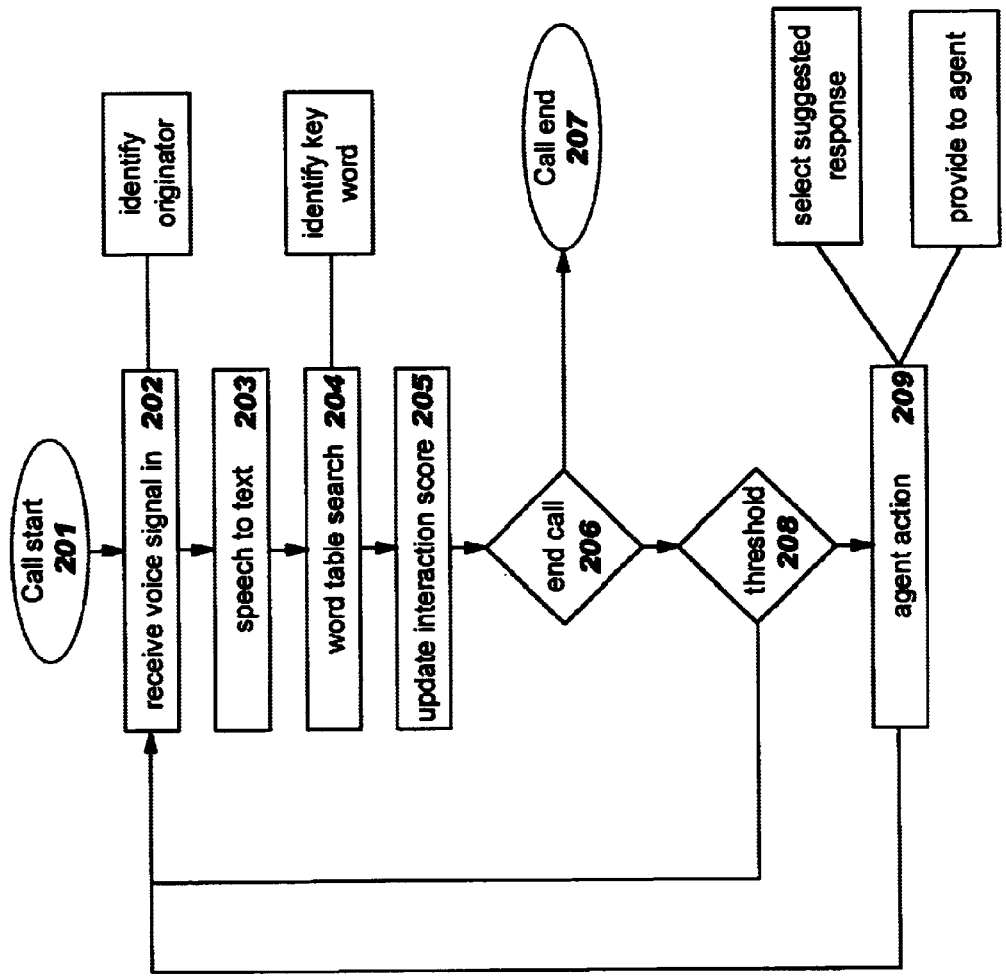
FIG. 4 is a process flow of the embodiment.

The method of the embodiment proceeds as follows with reference to FIG. 4.

A call starts with either an agent making a outbound call or a caller making an inbound call (step 201). Either way the PBX 20 sends a message over control line 21 to the network interface 46 which passes the message to the call processing software 42 and the voice processing software 44. If the call is inbound the call processing software 42 directs the call to an appropriate agent phone 22 by signaling the PBX 20 to initiate the business software on the agent's workstation with caller details. For both inbound and outbound calls the voice processing software 44 instantiates a voice application 62 to monitor the voice interaction.

The agent voice signal and caller voice signal are copied at the PBX 20 and transmitted over the telephone lines 23 to the telephony platform (step 202). This is transparent to the caller and the agent as the original voice signals continue through the PBX 20 to the respective recipients. The voice application associates the voice signal with a reference number incremented from the last reference number. The PBX supplies an indicator of the originator of the voice signal and this is associated with the voice signal reference number.

The voice signal from either party is transmitted through the network interface 46 to the SCBus 50 and processed by DSP 48. Frequency coefficients are passed to ASR server 54 and a text string is passed on to voice application 62 (step 203) and associated with the reference number of the voice signal.

The voice application 62 searches the text for occurrences of words or phrases in the word table 64 and acquires a score for any hits (step 204). The confrontation value associated with each record is an absolute value. The value is made negative if the hit is in the confrontational list and positive is in the non-confrontational alternative word list or the non-confrontation counter word list. The value is the same polarity for both the caller and the agent since the value is a measure of the whole interaction not just one side of the interaction.

The converted text is saved in the dialogue field in the dialogue store 66.

The voice application 62 updates a variable associated with the interaction (step 205) and the variable is saved in the score field of the dialogue store for that dialogue. At the start of the interaction the interaction value is reset to zero.

If the call ends the PBX 20 will send a message via the network interface 46 to the voice application and the end call routine is entered (step 206).

That particular interaction has an identification number and the dialogue store 66 is associated with the interaction number so that a complete history of the interaction along with a cumulative interaction score can be retrieved for later examination (step 207).

The interaction score is checked (step 208) against a threshold value and if so moves on to the agent action step (209). If below the threshold value the interaction is deemed not confrontational enough to warrant any action and the process starts over with a new voice signal input at step 202.

Step 209. The voice application checks whether it is the agent or caller who has taken the confrontation value over the threshold. If it is the agent then the voice application selects the polite alternative word or phrase in the records and flashes it on the screen to the agent as a warning. Furthermore the selection is stored in the dialogue store 66 along with the ASR text and dialogue reference number. If the caller has spoken the confrontational word or phrase then the voice application selects the counter confrontational word or phrase and flashes on the screen to the agent. Furthermore the selection is stored in the dialogue store 66 along with the ASR text and dialogue reference number.

In summary this invention relates to the automated assistance of a telephony call centre agent comprising a method and system for providing dialogue suggestions to an agent during an agent caller interaction. A prior art solution provides data based on analyzed text from one or other of the conversations but does not offer any useful information based on the performance of the agent or on the state of the interaction. A method of interaction in a voice response application comprising: receiving a voice signal in a call centre; identifying whether the caller or a call centre agent is the originator of the voice signal; converting the voice signal into computer readable text; identifying a key word such as a confrontational phrase e.g. 'what are you talking about' in the converted computer readable text; and providing a different suggestion depending on whether the originator is the call agent or the caller. For instance, a suggestion if the agent made the confrontational phrase would be to use a less confrontational phrase next time such as 'can you explain that again'. A suggestion if the caller made the confrontational phrase would be to counter with a 'I'll try to explain that better'.

"Windows NT" is a trademark of Microsoft Corporation and "Hicom" is a trademark of Siemens.

Although we have used confrontational and non-confrontational key words in this embodiment there is no reason why other oppositions could be used such as polite and not polite or politically correct or non-politically correct. A call centre supervisor could use different word stores depending on what aspect of training was desired. Alternatively different word stores could be used simultaneously to give an all round training to he want.

Although the embodiment has been described with respect to a key phrase it is envisaged that the key feature could be a particular tone of voice to denote an aggressive style. The ASR could be programmed with a dictionary of words which could distinguish between aggressively spoken words and quietly spoken words so that the key feature of a phrase or voice signal could be an aggression characteristic.

Although the interaction is described in the embodiment for a call centre it is not so limited and could easily be applied to a standalone training system for other forms of agents such as receptionists, secretaries. It is envisaged that it would be easy to adapted the methods outlined here for sales training techniques, therapy methods, role play and management techniques.

Now that the invention has been described by way of a preferred embodiment, various modifications and improvements will occur to those person skilled in the art. Therefore it should be understood that the preferred embodiment has been provided as an example and not as a limitation.

What is claimed is:

1. A system comprising:

means for receiving a voice signal;

first identifying means for identifying whether a caller or a call center agent is the originator of the voice signal;

second identifying means for identifying a key phrase, in the voice signal; and means for selecting one of a plurality of suggested responses depending on the first and second identifying means, wherein said means for selecting one of a plurality of suggested responses comprises first means for selecting a suggested response as an alternative to the response given if the originator is the call center agent and second means for selecting a suggested response as counter to the response given if the originator is the caller; and providing means for providing the selected suggested response to the agent so that the agent may use the suggested response immediately or at a future time.

2. A system as in claim 1 further comprising means for converting the voice signal into computer readable text.

3. A system as in claim 2 wherein the providing means stores the computer readable text and suggested response together for later retrieval.

4. A system as in claim 1 wherein each key phrase is stored in a field of a record in a key phrase table, a further field stores an alternative phrase and a further field stores a counter phrase.

5. A system as in claim 1 wherein said providing means places comments and suggestions on a caller workstation as a call comprising said voice signal is being placed.

6. A system in claim 1 further comprising means for grading each voice signal interaction with respect to the key phrase and acquiring a total grade for the interaction.

7. A method comprising:

receiving a voice signal;

identifying whether a caller or a call center agent is the originator of the voice signal;

identifying a key phrase in the voice signal; and selecting one of a plurality of suggested responses depending on the first and second identifying means, wherein a first suggested response is selected as an alternative to a response given if the originator is the call center agent and a second suggested response is selected as a counter to a response given if the originator is the caller; and providing the selected suggested response to the agent so that the agent may use the suggested response immediately or at a future time.

8. A method as in claim 7 further comprising a step of converting the voice signal into computer readable text.

9. A method as in claim 8 wherein each key phrase is stored in a field of a record in a key phrase table, a further field stores an alternative phrase and a further field stores a counter phrase.

10. A method as in claim 8 further comprising storing the computer readable text and suggested response together for later retrieval.

11. A method as in claim 7 further comprising placing comments and suggestions on a caller workstation as a call comprising said voice signal is being placed.

12. A system method as in claim 7 further comprising grading each voice signal interaction with respect to the key phrase and acquiring a total grade for the interaction.

13. A computer program product, stored on a computer-readable storage medium, for executing computer program instructions to carry out the steps of:

receiving a voice signal;

identifying whether a caller or a call center agent is the originator of the voice signal;

identifying a key phrase in the voice signal; and selecting one of a plurality of suggested responses depending on the first and second identifying means, wherein a first suggested response is selected as an alternative to a response given if the originator is the call center agent and a second suggested response is selected as a counter to a response given if the originator is the caller; and providing the selected suggested response to the agent so that the agent may use the suggested response immediately or at a future time.

14. A computer program product as in claim 13 further comprising converting the voice signal into computer readable text.

15. A computer program product as claimed in claim 14 wherein each key phrase is stored in a field of a record In a key phrase table, a further field stores an alterative phrase and a further field stores a counter phrase.

16. A computer program product as claimed in claim 14 further comprising storing the computer readable text and suggested response together for later retrieval.

17. A computer program product as claimed in claim 13 further comprising placing comments and suggestions on a caller workstation as a call comprising said voice signal is being placed.

18. A computer program product as claimed in claim 13 further comprising grading each voice signal interaction with respect to the key phrase and acquiring a total grade for the interaction.

* * * * *